United States Patent
Vui et al.

(10) Patent No.: US 10,482,014 B2
(45) Date of Patent: Nov. 19, 2019

(54) SYSTEM AND METHOD OF MANAGING A MEMORY MEDIUM

(71) Applicant: Dell Products L.P., Round Rock, TX (US)

(72) Inventors: Kan Lip Vui, Singapore (SG); Shun-tang Hsu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 15/672,066

(22) Filed: Aug. 8, 2017

(65) Prior Publication Data
US 2019/0050330 A1    Feb. 14, 2019

(51) Int. Cl.
*G06F 12/08* (2016.01)
*G06F 12/0804* (2016.01)
*G06F 3/06* (2006.01)

(52) U.S. Cl.
CPC ........ *G06F 12/0804* (2013.01); *G06F 3/0619* (2013.01); *G06F 3/0647* (2013.01); *G06F 3/0679* (2013.01); *G06F 3/0685* (2013.01); *G06F 2212/1032* (2013.01)

(58) Field of Classification Search
CPC .. G06F 12/0804; G06F 3/0685; G06F 3/0619; G06F 3/0647; G06F 2212/1032
See application file for complete search history.

(56) References Cited

U.S. PATENT DOCUMENTS

| | | | | |
|---|---|---|---|---|
| 6,536,671 | B1 * | 3/2003 | Baentsch | G06F 1/30 235/487 |
| 2005/0091445 | A1 * | 4/2005 | Chang | G06F 12/0246 711/103 |
| 2009/0063877 | A1 * | 3/2009 | Lewis | G06F 1/266 713/310 |
| 2009/0222627 | A1 | 9/2009 | Reid | |
| 2010/0042773 | A1 | 2/2010 | Yeh | |
| 2016/0266965 | A1 * | 9/2016 | B | G06F 11/108 |

(Continued)

OTHER PUBLICATIONS

NVM Express, "NVM Express." Revision 1.2, Nov. 3, 2014; 205 pages.

(Continued)

*Primary Examiner* — Hiep T Nguyen
(74) *Attorney, Agent, or Firm* — Baker Botts L.L.P.

(57) ABSTRACT

In one or more embodiments, one or more systems, methods, and/or processes may determine that an information handling system is to be powered down and provide, to a non-volatile memory medium via a power coupling of the non-volatile memory medium, information indicating that the non-volatile memory medium is to be powered down. For example, the power coupling of the non-volatile storage medium may include one or more conductors, and the information indicating that the non-volatile memory medium is to be powered down may be provided via at least one of the one or more conductors. In one or more embodiments, the non-volatile memory medium may include volatile storage and non-volatile storage. For example, based at least on the information indicating that the non-volatile memory medium is to be powered down, the non-volatile memory medium may store information, that is stored by the volatile storage, via the non-volatile storage.

20 Claims, 4 Drawing Sheets

(56) References Cited

U.S. PATENT DOCUMENTS

2016/0292078 A1   10/2016   Hsu et al.

OTHER PUBLICATIONS

Intel Corporation, "Serial ATA Device Sleep (DevSleep) and Runtime D3 (RTD3)." Dec. 2011; 11 pages.
"Information Technology—ATA/ATAPI Command Set—3 (ACS-3)." American National Standard, T13/2161-D, Revision 5, Oct. 28, 2013; 577 pages.

* cited by examiner

SYSTEM AND METHOD OF MANAGING A MEMORY MEDIUM

BACKGROUND

Field of the Disclosure

This disclosure relates generally to information handling systems and more particularly to power management of one or more devices of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Moreover, one or more devices of an information handling system may be powered down.

SUMMARY

In one or more embodiments, one or more systems, methods, and/or processes may provide information, indicating that an information handling system scheduled a shutdown, to a non-volatile storage device via a power coupling of the non-volatile storage device and may store operating context information to a non-volatile storage of the non-volatile storage device in response to receiving the information indicating that the information handling system scheduled the shutdown. For example, the power coupling of the non-volatile storage device may include one or more conductors. For instance, the information, indicating that the information handling system scheduled the shutdown, may be provided to the non-volatile storage device via the one or more conductors of the power coupling of the non-volatile storage device. In one or more embodiments, the non-volatile storage device may be or include a solid state drive (SSD). For example, the operating context information may include a flash translation layer (FTL) table. For instance, the FTL table may be stored in a cache of the SSD, and the SSD may store the FTL table via non-volatile storage of the SSD in response to receiving the information indicating that the information handling system scheduled the shutdown. In one or more embodiments, the information handling system may include an embedded controller. For example, the embedded controller may determine that the information handling system is to be powered down and may provide, to the non-volatile storage medium via the power coupling of the non-volatile storage medium, information indicating that the non-volatile storage medium is to be powered down.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
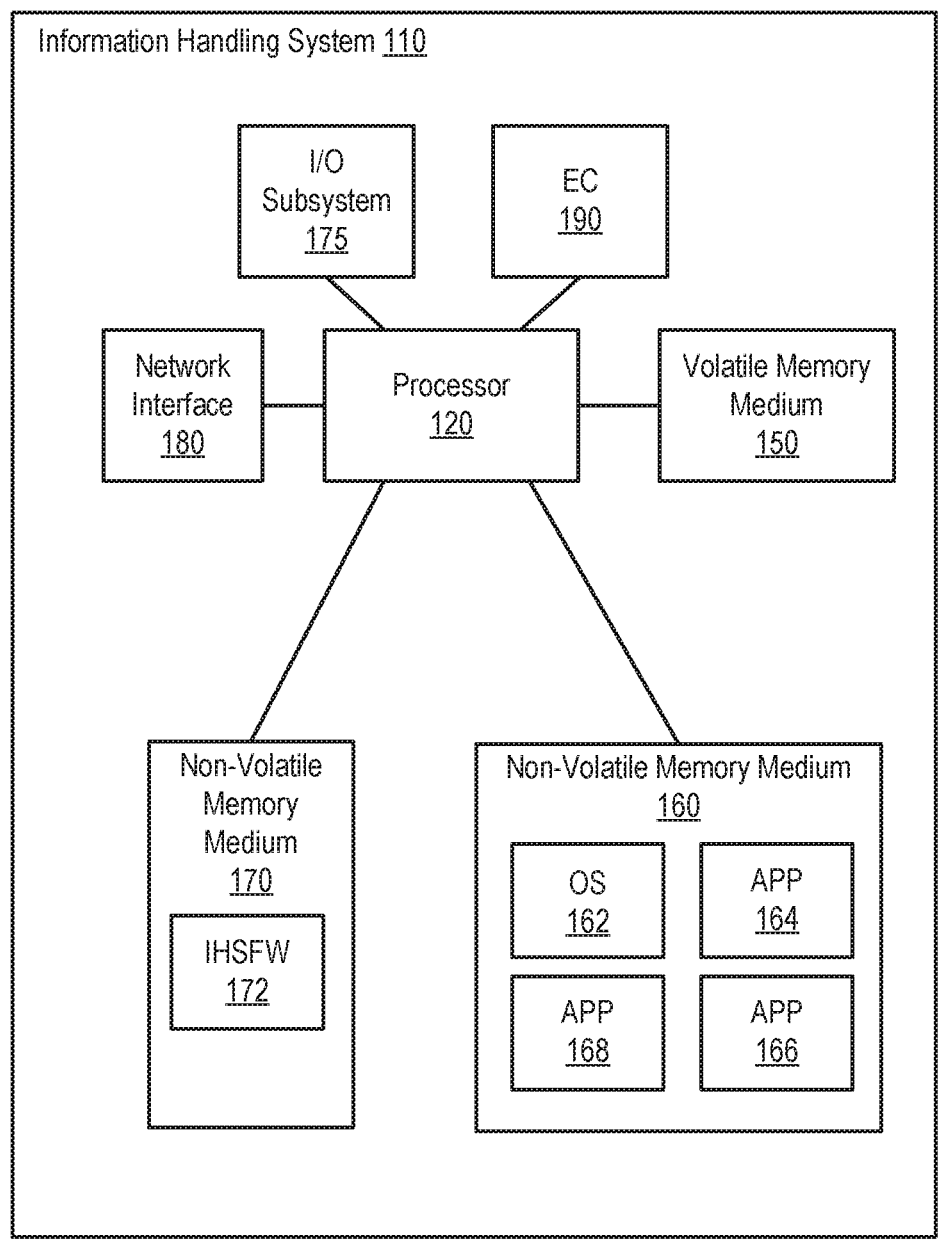
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, a non-volatile memory medium may be powered down (e.g., powered off). For example, the non-volatile memory medium may include non-volatile storage that may store executable instructions and/or data, associated with an information handling system (IHS), and may include volatile storage that may temporarily store one or more portions of the instructions and/or the data. For instance, the volatile storage of the non-volatile memory medium may be or include a cache. In one or more embodiments, information stored via the volatile storage of the non-volatile memory medium may be stored via the non-volatile storage of the non-volatile memory medium before the non-volatile memory medium is powered off. For example, the one or more portions of the instructions and/or the data may be stored via the non-volatile storage of the non-volatile memory medium before the non-volatile memory medium is powered off. For instance, the cache may be flushed to the non-volatile storage of the non-volatile memory medium before the non-volatile memory medium is powered off.

In one or more embodiments, an IHS may be powered down (e.g., powered off). For example, the IHS may include the non-volatile memory medium, and the one or more portions of the instructions and/or the data, stored by the volatile storage of the non-volatile memory medium, may be stored via the non-volatile storage of the non-volatile memory medium before the non-volatile memory medium is powered off, as the IHS is powered off. For instance, the IHS may be powered down outside a shutdown sequence that is configured to permit and/or allow the one or more portions of the instructions and/or the data, stored by the volatile storage of the non-volatile memory medium, to be stored via the non-volatile storage of the non-volatile memory medium before the non-volatile memory medium is powered off, when the IHS is powered off. In one or more embodiments, the non-volatile memory medium may be or include a solid state drive (SSD), and operating context information (e.g., operating context metadata) may include a flash translation layer (FTL) table. For example, the FTL table may include translation information that may map logical addresses to physical address associated with the SSD. For instance, the FTL table may be stored via the volatile storage of the non-volatile memory medium before the non-volatile memory medium is powered down.

In one or more embodiments, an embedded controller may determine that the IHS is to be powered off and may provide information to the non-volatile memory medium that the IHS is to be powered off. For example, the embedded controller may provide the information to the non-volatile memory medium that the IHS is to be powered off via a power coupling of the non-volatile memory medium. For instance, the power coupling of the non-volatile memory medium may include one or more conductors, and the embedded controller may provide the information to the non-volatile memory medium that the IHS is to be powered off via the one or more conductors of the power coupling of the non-volatile memory medium. In one or more embodiments, the non-volatile memory medium may include detection circuitry that monitors the one or more conductors of the power coupling. In one example, the detection circuitry may monitor the one or more conductors of the power coupling for a reduction in voltage to or below a threshold voltage. In another example, the detection circuitry may monitor the one or more conductors of the power coupling for a sequence in a reduction in voltage to or below a threshold voltage. In one instance, the sequence may be communicated via a single conductor of the power coupling. In another instance, the sequence may be communicated via multiple conductors of the power coupling.

Turning now to FIG. 1, an example of an information handling system is illustrated, according to one or more embodiments. An IHS 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and an embedded controller (EC) 190. As illustrated, volatile memory medium 150, non-volatile memory media 160 and 170, I/O subsystem 175, network interface 180, and EC 190 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, EC 190 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP 430 microcontroller, an Argonaut RISC Core (ARC) embedded processor, an Andes core embedded processor, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 190 may be or include one or more of a field programmable gate array (FPGA) and an application specific integrated circuit (ASIC), among others, configured, coded, and/or encoded with instructions in accordance with one or more of systems, flowcharts, methods, and/or processes described herein. In one or more embodiments, EC 190 may be configured, coded, and/or encoded with instructions in accordance with one or more of systems, flowcharts, methods, and/or processes described herein and perform one or more functions and/or operations independently of processor 120.

Figure 2:
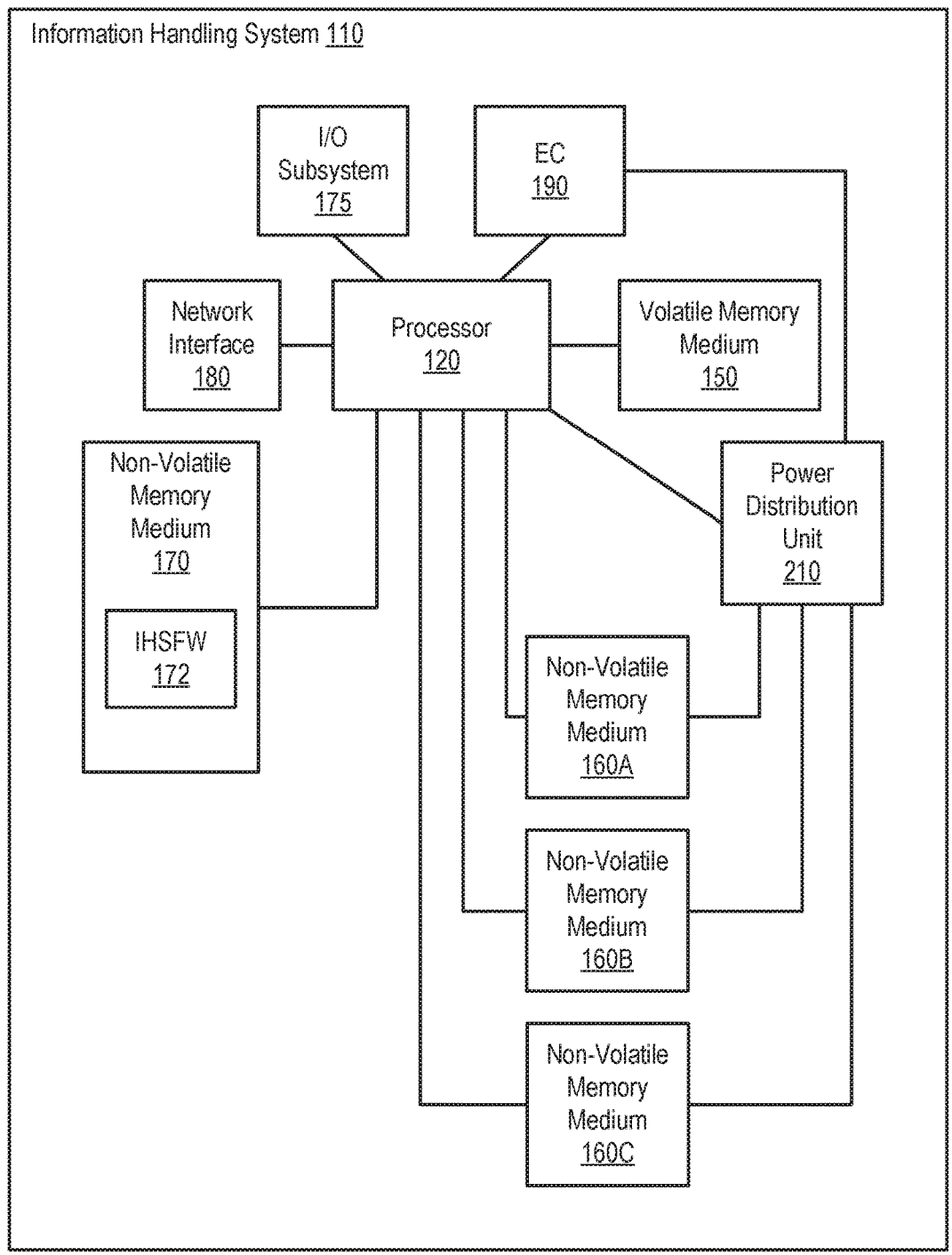
FIG. 2 illustrates another example of an information handling system, according to one or more embodiments.

Turning now to FIG. 2, a further example of an information handling system is illustrated, according to one or more embodiments. As shown, IHS 110 may include a power distribution unit 210. For example, power distribution unit 210 may provide power to one or more elements of IHS 110. As illustrated, EC 190 may be coupled to power distribution unit 210. As illustrated, power distribution unit 210 may be coupled to non-volatile memory media 160A-160C and may be coupled to processor 120. In one example, power distribution unit 210 may provide power to non-volatile memory media 160A-160C. In another example, power distribution unit 210 may provide information to non-volatile memory media 160A-160C.

In one or more embodiments, non-volatile storage medium 160 may receive read and/or write instructions from IHS 110. In one example, a read instruction may include a request and/or a query for information from non-volatile storage medium 160. In another example, a write instruction may include a request to store information to non-volatile storage medium 160. In one or more embodiments, non-volatile storage medium 160 may store information via volatile storage and/or non-volatile storage. For example, non-volatile storage medium 160 may store information via a cache (e.g., a volatile storage). In one instance, non-volatile storage medium 160 may store metadata (e.g., a flash translation layer table) via the cache. In another instance, after storing the information via a cache, non-volatile storage medium 160 may store the information via a non-volatile storage. In one or more embodiments, non-volatile storage medium 160 may utilize and/or implement a wear-leveling process, method, and/or system. For example, non-volatile storage medium 160 may store information via the cache, and after an amount of information is stored via the cache, non-volatile storage medium 160 may store the information via the non-volatile storage.

In one or more embodiments, an event that may cause a power loss may occur while information is being stored in the cache and prior storing the information via the non-volatile storage. For example, the power loss may occur from a forced shutdown (e.g., a forced shutdown of IHS 110). For instance, a forced shutdown may be referred to as a dirty shutdown if the data in the cache is lost during the shutdown. In one or more embodiments, an event that may cause a power loss may occur while information is being stored in the cache may be produced by an operating system. For example, OS 162 may incur an error or an error state, and OS 162 may produce the event that may cause a power loss may occur while information is being stored in the cache. In one or more embodiments, an event that may cause a power loss may occur while information is being stored in the cache may be produced by a user. For example, a user may actuate a power button of IHS 110, and actuating the power button of IHS 110 may cause a power loss may occur while information is being stored in the cache.

In one or more embodiments, EC 190 may monitor one or more systems of IHS. For example, EC 190 may monitor one or more systems of IHS to determine if a shutdown is to occur. In one or more embodiments, EC 190 may determine that IHS 110 is to be shut down. For example, EC 190 may provide information to non-volatile storage medium 160 via a power coupling of non-volatile storage medium 160, indicating that cached information should be stored by a non-volatile storage of the non-volatile storage medium. For instance, EC 190 may provide information, via power distribution unit 210, to non-volatile memory medium 160 via a power coupling of non-volatile memory medium 160, indicating that cached information should be stored by a non-volatile storage of the non-volatile storage medium. In one or more embodiments, power distribution unit 210 may provide the information to non-volatile memory media 160A-160C via respective power couplings of non-volatile memory media 160A-160C.

Figure 3:
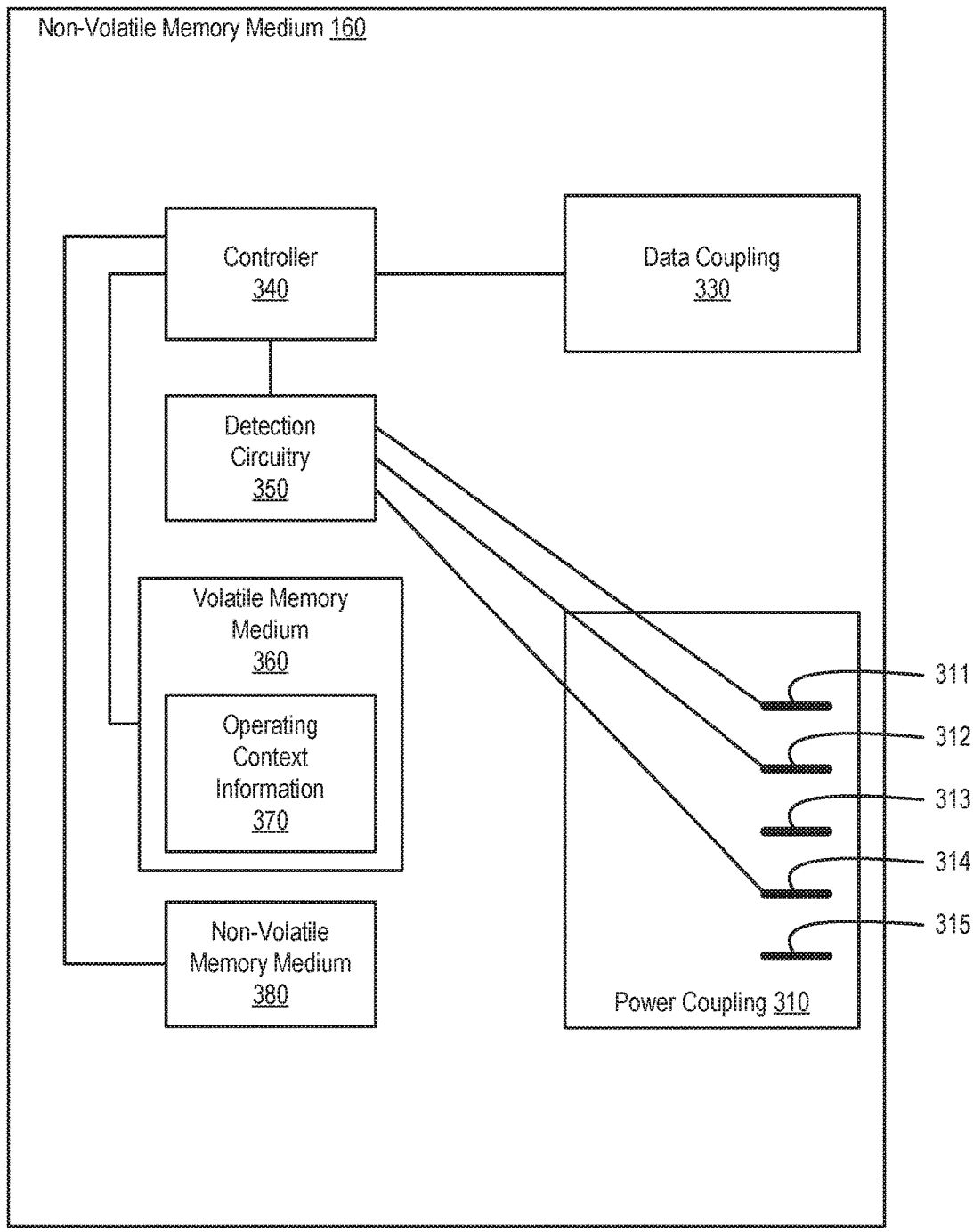
FIG. 3 illustrates an example of a non-volatile memory medium, according to one or more embodiments.

Turning now to FIG. 3, an example of a non-volatile memory medium is illustrated, according to one or more embodiments. As shown, non-volatile memory medium 160 may include a power coupling 310, which may include conductors 311-315. In one or more embodiments, a conductor of conductors 311-315 may be configured as an electro-mechanical device that may be utilized in joining electrical terminations and/or in creating an electrical circuit. For example, a conductor of conductors 311-315 may be configured to interface with another conductor and/or connector and may be configured to transfer power and/or information from the other conductor and/or connector. In one instance, a conductor of conductors 311-315 may be configured as a male connector. In a second instance, a conductor of conductors 311-315 may be configured as a female connector. In another instance, a conductor of conductors 311-315 may be configured as a trace of a printed circuit board (PCB).

In one or more embodiments, one or more of conductors 311-315 may be utilized in receiving power. For example, one or more of conductors 311-315 may be utilized in receiving power from power distribution unit 210. In one or more embodiments, one or more of conductors 311-315 may be utilized in receiving information. For example, one or more of conductors 311-315 may be utilized in receiving information from power distribution unit 210. For instance, one or more of conductors 311-315 may be utilized in receiving information from EC 190 via power distribution unit 210.

As illustrated, conductors 311, 312, and 314 may be coupled to detection circuitry 350. In one or more embodiments, detection circuitry 350 may detect, determine, and/or receive information conveyed via one or more of conductors 311, 312, and 314. As shown, conductors 311 and 312 may be contiguous, and conductors 312 and 314 may not be contiguous. In one or more embodiments, detection circuitry 350 may detect, determine, and/or receive information conveyed from power distribution unit 210. As illustrated, detection circuitry 350 may be coupled to a controller 340 that may be included in non-volatile memory medium 160. In one or more embodiments, controller 340 may include detection circuitry 350.

In one or more embodiments, detection circuitry 350 may provide the information conveyed via one or more of conductors 321, 322, and 314 to controller 340. For example, detection circuitry 350 may provide the information conveyed from power distribution unit 210 to controller 340. In one or more embodiments, providing the information may include providing a signal to controller 340. In one example, the signal may be a communications signal utilized with a bus. In another example, the signal may be a communications signal such as a change in a voltage level. In one instance, the signal may be or include an interrupt signal. In a second instance, the change in the voltage level may be or include a change to a voltage level below a threshold voltage. In a third instance, the change in the voltage level may be or include a change to a voltage level above a threshold voltage. In a fourth instance, the change in the voltage level may be or include a change to a reference voltage (e.g., ground, logical zero, etc.) level. In another instance, the change in the voltage level may be or include a change to a "logical one" voltage level.

As shown, non-volatile memory medium 160 may include a data coupling 330. In one example, data coupling 330 may be or include a SATA coupling. For instance, non-volatile memory medium 160 may be or include a SATA non-volatile memory medium. In another example, data coupling 330 may be or include a PCIe coupling. For instance, non-volatile memory medium 160 may be or include a PCIe non-volatile memory medium. In one or more embodiments, a data path to IHS 110 may be established and/or implemented utilizing data coupling 330. In one example, the data path may include a cable and/or a bus, among others. For instance, the data path may include a SATA cable and/or coupling. In a second example, the data path may include a PCIe data path. In another example, the data path may include a SATA data path.

As illustrated, non-volatile memory medium 160 may include a volatile memory medium 360. In one or more embodiments, volatile memory medium 360 may be or include volatile storage. For example, volatile memory medium 360 may include one or more structures and/or one or more functionalities of a volatile memory medium described herein. In one or more embodiments, volatile memory medium 360 may store operating context information 370. For example, operating context information 370 may include a FTL table. For instance, volatile memory medium 360 may store cached information, and the cached information may include operating context information 370.

As shown, non-volatile memory medium 160 may include a non-volatile memory medium 380. In one or more embodiments, non-volatile memory medium 380 may be or include non-volatile storage. For example, non-volatile memory medium 380 may include one or more structures and/or one or more functionalities of a non-volatile memory medium described herein. For instance, non-volatile memory medium 380 may include flash memory. In one or more embodiments, non-volatile memory medium 380 may store information utilized by IHS 110. In one example, non-volatile memory medium 380 may store one or more of OS 162 and APPs 164-168, among others. In another example, non-volatile memory medium 380 may store data utilized by IHS 110. For instance, non-volatile memory medium 380 may store data utilized by one or more of OS 162 and APPs 164-168, among others.

Figure 4:
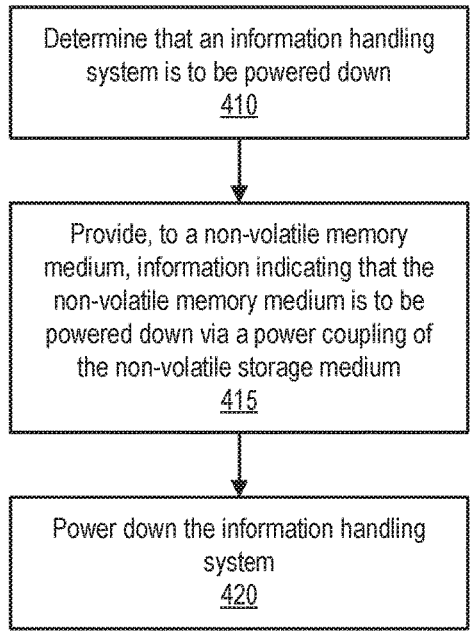
FIG. 4 illustrates a method of operating an information handling system, according to one or more embodiments.

Turning now to FIG. 4, a method of operating an information handling system is illustrated, according to one or more embodiments. At 410, it may be determined that the information handling system is to be powered down. In one or more embodiments, EC 190 may determine that IHS 110 is to be powered down. For example, determining that IHS 110 is to be powered down may include EC 190 receiving information and/or one or more signals indicating that IHS 110 is to be powered down. In one instance, EC 190 may receive information and/or one or more signals indicating that IHS 110 is to be powered down via an actuation of a power button of IHS 110. In another instance, EC 190 may receive information and/or one or more signals indicating that IHS 110 is to be powered down via and/or from OS 162.

At 415, information indicating that the non-volatile storage medium is to be powered down may be provided to the non-volatile storage medium via a power coupling of the non-volatile storage medium. In one or more embodiments, EC 190 may provide, to non-volatile storage medium 160 via power coupling 310, information indicating that non-volatile storage medium 160 is to be powered down. In one example, the information indicating that non-volatile storage medium 160 is to be powered down may indicate that cached information should be stored by non-volatile storage 380 of non-volatile storage medium 160. In another example, EC 190 may provide, to non-volatile storage medium 160 via power coupling 310, information indicating that non-volatile storage medium 160 is to be powered down via power distribution unit 210.

In one or more embodiments, the power coupling of the non-volatile storage medium may include one or more conductors. For example, the information indicating that non-volatile storage medium 160 is to be powered down may be provided to the non-volatile storage medium via the one or more conductors of the power coupling of the non-volatile storage medium. For instance, an indication that cached information should be stored by non-volatile storage 380 of non-volatile storage medium 160 may be received via one or more of conductors 311, 312, and 314 of power coupling 310 of non-volatile storage medium 160.

At 420, the information handling system may be powered down. For example, IHS 110 may be powered down. For instance, EC 190 may power down IHS 110. In one or more embodiments, EC 190 may delay powering down IHS 190 for a period of time. For example, the period of time may allow and/or permit non-volatile storage medium 160 to store cached information via non-volatile storage (e.g., non-volatile memory medium 380). For instance, the period of time may include a few seconds. In one or more embodiments, EC 190 may be configured with the period of time.

Figure 5:
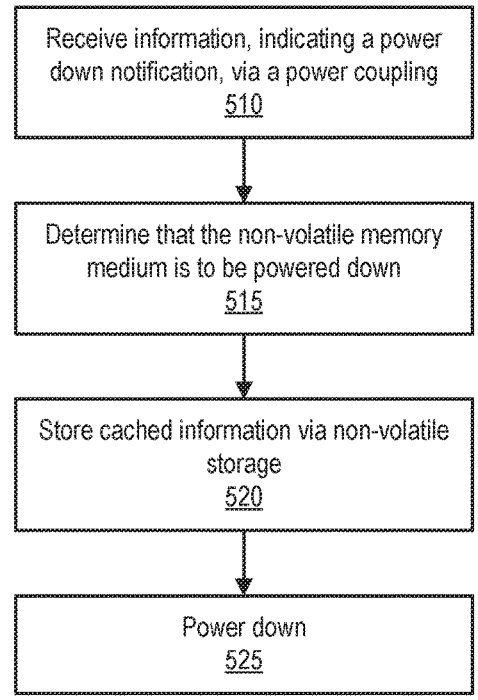
FIG. 5 illustrates a method of operating a non-volatile storage device is illustrated, according to one or more embodiments.

Turning now to FIG. 5, a method of operating a non-volatile memory medium is illustrated, according to one or more embodiments. At 510, information, indicating that a non-volatile memory medium is to be powered down, may be received via a power coupling. For example, non-volatile storage medium 160 may receive information, indicating that it is to be powered, via power coupling 310. For instance, non-volatile storage medium 160 may receive, from EC 190, information, indicating that it is to be powered down, via one or more of conductors 311, 312, and 314 of power coupling 310. At 515, it may be determined that the non-volatile memory medium is to be powered down. For example, detection circuitry 350 may determine that non-volatile memory medium 160 is to be powered down. For instance, circuitry 350 may determine that non-volatile memory medium 160 is to be powered down, based at least on the information received via power coupling 310.

At 520, cached information may be stored via non-volatile storage. In one example, non-volatile storage medium 160 may store information, that is stored by volatile storage (e.g., volatile memory medium 360), via non-volatile storage (e.g., non-volatile memory medium 380). In another example, storing the cached information via the non-volatile storage may be based at least on and/or in response to receiving the information, indicating that the non-volatile memory medium is to be powered down. In one or more embodiments, non-volatile storage medium 160 may store information via the volatile storage until a threshold of data size is met or exceeded. For example, non-volatile storage medium 160 may store the information, that is stored by the volatile storage via the volatile storage, to the non-volatile storage when or after the threshold of data size is met or exceeded. In one or more embodiments, the threshold of data size may not be met or exceeded when the non-volatile memory medium is to be powered down, and the non-volatile memory medium may store the information, that is stored by the volatile storage, via the non-volatile storage before the non-volatile memory medium is to be powered down. For example, the volatile storage (e.g., volatile memory medium 360) may store cached information, and the cached information may be flushed (e.g., stored) to non-volatile storage (e.g., non-volatile memory medium 380) before the non-volatile memory medium is to be powered down.

In one or more embodiments, storing the cached information via the non-volatile storage may include performing a cache flush operation. In one example, the cache flush operation may be performing in response to receiving the information indicating that the non-volatile memory medium is to be powered down. For instance, non-volatile memory medium 160 may perform the cache flush operation without causing a break in a SATA command sequence. In another example, the cache flush operation may cause the non-volatile memory medium to store the cached information via the non-volatile storage. In one or more embodiments, the volatile storage may store operating context information of the non-volatile memory medium. For example, volatile storage (e.g., volatile memory medium 360) may store operating context information 370, and operating context information 370 may be stored to the non-volatile storage (e.g., non-volatile storage 380) before the non-volatile memory medium is to be powered down. For instance, the non-volatile memory medium may be or include a SSD, operating context information 370 may be or include a FTL table, and the FTL table may be stored to the non-volatile storage (e.g., non-volatile memory medium 380) before the non-volatile memory medium is to be powered down.

At 525, the non-volatile memory medium may be powered down. In one example, non-volatile storage medium 160 may power down itself. For instance, non-volatile storage medium 160 may power down itself after storing operating context information 370 via non-volatile storage 380. In another instance, IHS 110 may power down non-volatile storage medium 160. For instance, EC 190 may power down non-volatile storage medium 160 after a period of time after providing non-volatile storage medium 160 the information indicating that non-volatile memory medium 160 is to be powered down.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a processor;
   a memory medium, communicatively coupled to the processor; and
   an embedded controller coupled to the processor;
   wherein the embedded controller is configured to:
      determine that the information handling system is to be powered down; and
      provide, to a non-volatile memory medium via a power coupling of the non-volatile memory medium, information indicating that the non-volatile memory medium is to be powered down.

2. The information handling system of claim 1,
   wherein the power coupling of the non-volatile memory medium includes one or more conductors; and
   wherein, to provide the information, to the non-volatile memory medium via the power coupling of the non-volatile memory medium, indicating that the non-volatile memory medium is to be powered down, the embedded controller is further configured to provide the information, to the non-volatile memory medium via at least one of the one or more conductors of the power coupling of the non-volatile memory medium, indicating that the non-volatile memory medium is to be powered down.

3. The information handling system of claim 1, further comprising:
   the non-volatile memory medium;
   wherein the non-volatile memory medium is configured to receive the information indicating that the non-volatile memory medium is to be powered down via the power coupling of the non-volatile memory medium.

4. The information handling system of claim 3,
   wherein the non-volatile memory medium includes volatile storage configured to cache information;
   wherein the non-volatile memory medium includes non-volatile storage; and
   wherein the non-volatile memory medium is configured to store, via the non-volatile storage, the information cached by the volatile storage.

5. The information handling system of claim 4, wherein the non-volatile memory medium includes a solid state drive.

6. The information handling system of claim 5, wherein the information includes a flash translation layer table.

7. The information handling system of claim 3,
   wherein the power coupling of the non-volatile memory medium includes one or more conductors; and
   wherein, to receive the information indicating that the information indicating that the non-volatile memory medium is to be powered down via the power coupling of the non-volatile memory medium, the non-volatile memory medium is further configured to receive the information indicating that the non-volatile memory medium is to be powered down via at least one of the one or more conductors of the power coupling of the non-volatile memory medium.

8. A method, comprising:
   determining, by an embedded controller of an information handling system, that the information handling system is to be powered down; and
   providing, by the embedded controller, to a non-volatile memory medium via a power coupling of the nonvolatile memory medium, information indicating that the non-volatile memory medium is to be powered down.

9. The method of claim 8,
wherein the power coupling of the non-volatile memory medium includes one or more conductors; and
wherein the providing, by the embedded controller, to the non-volatile memory medium via the power coupling of the non-volatile memory medium, the information indicating that the non-volatile memory medium is to be powered down includes providing, by the embedded controller, to the non-volatile memory medium via at least one of the one or more conductors of the power coupling of the non-volatile memory medium, the information indicating that the non-volatile memory medium is to be powered down.

10. The method of claim 8, further comprising:
receiving, by the non-volatile memory medium, via the power coupling of the non-volatile memory medium, the information indicating that the indicating that the non-volatile memory medium is to be powered down.

11. The method of claim 10,
wherein the non-volatile memory medium includes volatile storage configured to cache information;
wherein the non-volatile memory medium includes non-volatile storage; and
wherein the non-volatile memory medium is configured to store, via the non-volatile storage, the information cached by the volatile storage;
the method further comprising:
based at least on the non-volatile memory medium receiving the information, via the power coupling of the non-volatile memory medium, indicating that the non-volatile memory medium is to be powered down, storing, the non-volatile memory medium, the information via the non-volatile storage of the non-volatile memory medium.

12. The method of claim 11, wherein the non-volatile memory medium includes a solid state drive.

13. The method of claim 12, wherein the information includes a flash translation layer table.

14. The method of claim 10,
wherein the power coupling of the non-volatile memory medium includes one or more conductors; and
wherein the receiving, by the non-volatile memory medium, via the power coupling of the non-volatile memory medium, the information indicating that the indicating that the non-volatile memory medium is to be powered down includes receiving, by the non-volatile memory medium, via at least one of the one or more conductors of the power coupling of the non-volatile memory medium, the information indicating that the indicating that the non-volatile memory medium is to be powered down.

15. A non-volatile memory medium, comprising:
a volatile storage;
a non-volatile storage; and
a power coupling;
wherein the non-volatile memory medium is configured to:
receive, via the power coupling, information indicating that the non-volatile memory medium is to be powered down; and
store cached information, that is stored by the volatile storage, via the non-volatile storage, based at least on receiving the information indicating that the non-volatile memory medium is to be powered down.

16. The non-volatile memory medium of claim 15,
wherein the power coupling includes one or more conductors; and
wherein, to receive, via the power coupling, the information indicating that the non-volatile memory medium is to be powered down, the non-volatile memory medium is further configured to receive, via at least one of the one or more conductors of the power coupling, the information indicating that the non-volatile memory medium is to be powered down.

17. The non-volatile memory medium of claim 15, wherein the non-volatile memory medium includes a solid state drive.

18. The non-volatile memory medium of claim 17, wherein the cached information includes a flash translation layer table.

19. The non-volatile memory medium of claim 15, wherein the non-volatile memory medium is further configured to perform a cache flush operation, in response to receiving, via the power coupling, the information indicating that the non-volatile memory medium is to be powered down, which causes the non-volatile memory medium to store the cached information via the non-volatile storage.

20. The non-volatile memory medium of claim 19, wherein the non-volatile memory medium performs the cache flush operation without causing a break in a serial advanced technology attachment (SATA) command sequence.

* * * * *